C. KRALICEK.
OILING DEVICE
APPLICATION FILED JUNE 27, 1918.
1,282,873.
Patented Oct. 29, 1918.
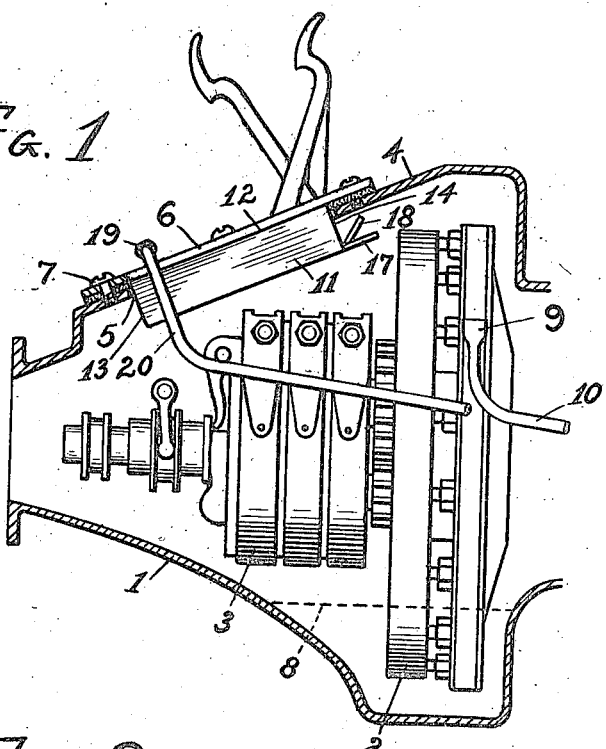
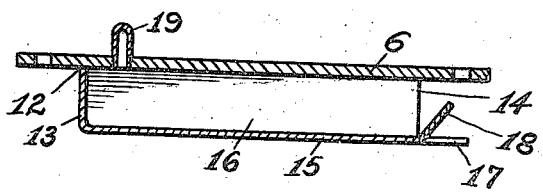
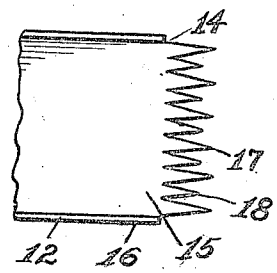
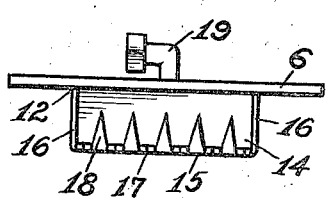
Inventor
Charles Kralicek
By G. E. Dunstan,
his Attorney

UNITED STATES PATENT OFFICE.

CHARLES KRALICEK, OF CLEVELAND, OHIO, ASSIGNOR OF ONE-HALF TO JAMES VANIS, OF CLEVELAND, OHIO.

OILING DEVICE.

1,282,873.

Specification of Letters Patent.

Patented Oct. 29, 1918.

Application filed June 27, 1918. Serial No. 242,138.

*To all whom it may concern:*

Be it known that I, CHARLES KRALICEK, a subject of Austria, residing at Cleveland, in the county of Cuyahoga and State of Ohio, have invented certain new and useful Improvements in Oiling Devices, of which the following is a specification.

This invention relates to oiling devices and has for its main object to provide means for conveying oil from the rear to the forward end of the engine housing of a "Ford" automobile. In the present arrangement, the cup for receiving the oil as it is splashed therein by the rotating of the engine fly-wheel which runs in oil, and the pipe leading from said cup, become clogged up due to the particles or threads of fiber which wear off the linings of the brake bands and fall into the oil. The clogging up of said cup and pipe prevents proper oiling of the crank shaft bearings and other parts, and this invention is designed to insure proper oiling of the same. It is accomplished by arranging an oil catching pan at the top of the engine housing with its open end adjacent the fly-wheel, and protecting said open end against the entrance of the aforesaid threads of fiber by means of teeth. These teeth also serve to catch said threads of fiber as they are produced, and thus prevent them from breaking the gears by becoming entangled in the same.

In order that the invention may be clearly understood, the same will be hereinafter fully described in connection with the accompanying drawings, and the novel features thereof will be distinctly pointed out in the appended claims.

In the drawings similar characters of reference designate corresponding parts.

Figure 1 is a longitudinal sectional view of a part of the engine housing of an automobile with the mechanism therein, and an oiling device constructed in accordance with my invention applied thereto, Fig. 2 is a longitudinal sectional view of the oil catching pan, Fig. 3 is a front end view of the same, and Fig. 4 is a plan view of the front end of the pan with the cover omitted.

Referring to the drawings, 1 represents that part of the housing of an automobile engine, which incloses the fly-wheel 2, and the brakes 3. The top 4 of the housing is inclined rearwardly, and over the brakes is provided with an opening 5, which is closed by a removable cover plate 6, for permitting access to the mechanism within the housing. Said cover plate is held in place by means of screws 7. As is well known, the fly-wheel runs in oil to about the level of the dotted line 8, and the rotating of the fly-wheel splashes oil into the cup 9, which oil is carried by the pipe 10 to the forward end of the engine housing for oiling the crank shaft bearings and other parts as it flows back to the well for the fly-wheel. Owing to the location of the brakes being near the fly-wheel, threads of fiber, as they wear off the linings of the brake bands, are carried into the cup 9 and soon clog up the cup and the pipe, thus preventing proper oiling of the crank shaft bearings and other revolving parts.

My invention was designed to overcome this trouble and consists in providing a sheet metal pan 11, which is fixed in any suitable manner, as for instance by soldering its edges 12 to the underside of the before mentioned cover plate 6. The pan is made with a closed rear end 13, and the forward end is open at 14 for receiving the oil as it is carried up and splashed therein by the revolving fly-wheel. In order to prevent the particles or threads of fiber, which wear off the brake band linings, entering the open end 14 of the pan, and also for retaining the same, the lower side 15 thereof projects beyond the sides 16 and is cut in the form of sharp pointed teeth 17. Each alternating tooth as 18, is bent upwardly on an inclination across the open end of the pan. Said teeth not only prevent the threads of fiber entering the pan but also catch and retain the same as fast as they are produced, thereby preventing them accumulating and winding between the gears thus breaking them. By removing the cover plate 6, the threads of fiber may be easily and quickly removed from the teeth of the pan. The cover plate 6 is provided with a threaded opening for receiving an elbow 19, to which is coupled a pipe 20 for conveying the oil to the forward end of the engine housing as in the present practice.

It will be understood that slight changes in the details of construction may be made so long as they are within the scope of the claims, and although the oiling device herein disclosed is especially applicable to a "Ford" automobile, it is not intended to limit it to this particular purpose.

Having fully described my invention, what I claim is:

1. An oiling device comprising a pan having an open end for receiving oil, an outlet pipe leading from the pan, the pan having teeth at its open end for preventing the entrance of threads of fiber, substantially as described.

2. An oiling device comprising a pan having an open end for receiving oil, an outlet pipe leading from the pan, teeth projecting from one edge of the open end of the pan, and other teeth arranged across the open end of the pan, substantially as described.

3. An oiling device comprising an inclined pan having an upper open end for receiving oil, an outlet pipe leading from the lower end of the pan, the pan having a side projecting beyond its open end, the projecting part of said side being cut to form teeth, and some of said teeth being bent across the open end of the pan, substantially as described.

4. An oiling device comprising a plate adapted to be arranged on an inclination, a pan fixed to the plate and having a forward open end for receiving oil, an outlet pipe fixed in said plate for conveying oil from the pan, the lower side of the pan projecting beyond the open end of the pan, the projecting part of said lower side being cut to form teeth, and the alternating teeth being bent across the open end of the pan, substantially as described.

In testimony whereof I affix my signature.

CHARLES KRALICEK.